United States Patent
Buller et al.

(10) Patent No.: US 8,872,655 B2
(45) Date of Patent: Oct. 28, 2014

(54) SYSTEM, METHOD AND NETWORK FOR MONITORING OF LOCATION OF ITEMS

(75) Inventors: Matthew Buller, Camberley (GB);
Hamish Orrick, New York, NY (US);
Aiden Turner, New York, NY (US)

(73) Assignee: Cellwitch Inc., New York, NY (US)

( * ) Notice: Subject to any disclaimer, the term of this patent is extended or adjusted under 35 U.S.C. 154(b) by 799 days.

(21) Appl. No.: 12/719,483

(22) Filed: Mar. 8, 2010

(65) Prior Publication Data

US 2010/0164715 A1 Jul. 1, 2010

Related U.S. Application Data

(63) Continuation-in-part of application No. 12/523,961, filed as application No. PCT/GB2008/050043 on Jan. 22, 2008, now abandoned.

(51) Int. Cl.
*G08B 1/08* (2006.01)
*G08B 21/02* (2006.01)
*G08B 21/24* (2006.01)

(52) U.S. Cl.
CPC ........ *G08G 13/1427* (2013.01); *G08B 21/0247* (2013.01); *G08B 21/0227* (2013.01); *G08B 21/24* (2013.01)
USPC .................................................. 340/539.32

(58) Field of Classification Search
USPC ................. 340/539.32, 539.15, 573.1, 573.4, 340/539.21, 539.23
See application file for complete search history.

(56) References Cited

U.S. PATENT DOCUMENTS

| | | | |
|---|---|---|---|
| 5,731,757 A | | 3/1998 | Layson, Jr. |
| 6,967,576 B2 * | | 11/2005 | Hayes et al. ............... 340/572.1 |
| 7,015,817 B2 | | 3/2006 | Copley et al. |
| 7,084,764 B2 | | 8/2006 | McHugh et al. |
| 7,095,325 B2 | | 8/2006 | McDonald et al. |
| 7,898,414 B2 * | | 3/2011 | Spano .......................... 340/571 |
| 8,169,328 B2 * | | 5/2012 | Duvall et al. .............. 340/573.4 |

(Continued)

FOREIGN PATENT DOCUMENTS

| | | |
|---|---|---|
| GB | 2400711 A | 10/2010 |
| WO | 0221864 A1 | 3/2002 |
| WO | 2008090377 A2 | 7/2008 |

OTHER PUBLICATIONS

International Search Report of the International Searching Authority corresponding to PCT/US2011/027548 mailed Jun. 16, 2011.

(Continued)

*Primary Examiner* — Phung Nguyen
(74) *Attorney, Agent, or Firm* — Nixon & Vanderhye P.C.

(57) ABSTRACT

A network for monitoring of location of items is provided, including a plurality of wireless devices, where each of the plurality of wireless devices is associated with a monitored item. Each of a plurality of mobile stations are associated with a respective user and configured to generate an alert when at least one respective wireless device of the plurality of wireless devices exceeds a location parameter. A processing system is in communication with the plurality of mobile stations, and the processing system includes a database that collects and stores data related to the plurality of wireless devices and the plurality of mobile stations.

23 Claims, 13 Drawing Sheets

(56) References Cited

U.S. PATENT DOCUMENTS

| | | |
|---|---|---|
| 2002/0154034 A1 | 10/2002 | Flick |
| 2003/0063003 A1* | 4/2003 | Bero et al. ................. 340/573.1 |
| 2003/0117281 A1 | 6/2003 | Sriharto et al. |
| 2004/0085207 A1* | 5/2004 | Kreiner et al. ............. 340/572.1 |
| 2004/0174264 A1* | 9/2004 | Reisman et al. ........... 340/573.4 |
| 2004/0203859 A1* | 10/2004 | Yuen et al. ................. 455/456.1 |
| 2005/0068169 A1* | 3/2005 | Copley et al. ............ 340/539.13 |
| 2005/0285739 A1* | 12/2005 | Velhal et al. ............... 340/572.1 |
| 2006/0290480 A1 | 12/2006 | Funk et al. |
| 2007/0101413 A1 | 5/2007 | Vishik et al. |
| 2009/0063193 A1 | 3/2009 | Barton et al. |
| 2009/0143018 A1 | 6/2009 | Anderson et al. |

OTHER PUBLICATIONS

Written Opinion of the International Searching Authority corresponding to PCT/US2011/027548 mailed Jun. 16, 2011.

European Search Report of European Divisional Application No. 11 004 558.0 dated Jul. 29, 2011.

* cited by examiner

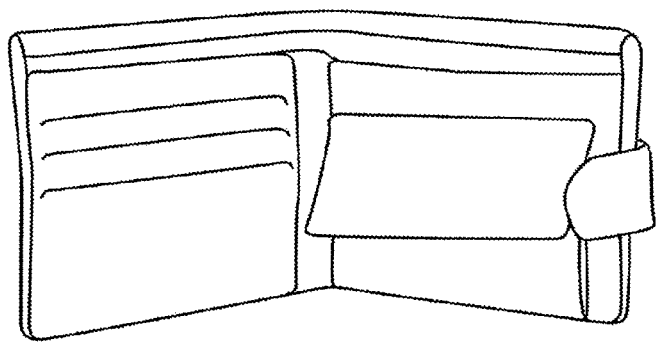
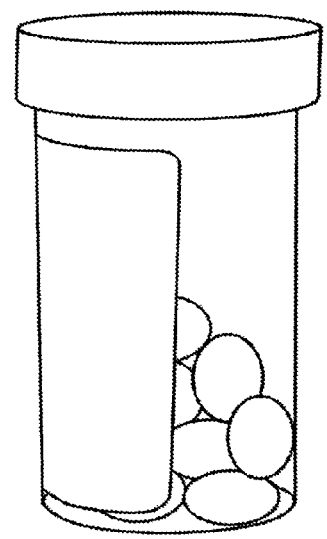
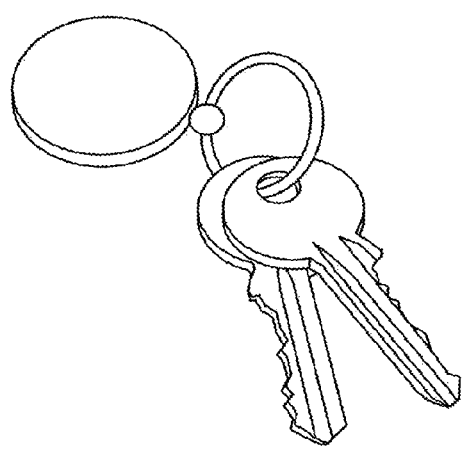
Fig 4

SYSTEM, METHOD AND NETWORK FOR MONITORING OF LOCATION OF ITEMS

RELATED APPLICATION

This application is a continuation-in-part of U.S. application Ser. No. 12/523,961, filed Jul. 21, 2009, which is a U.S. national phase entry based on PCT Patent Application No. PCT/GB08/50043, filed Jan. 22, 2008.

FIELD OF THE INVENTION

This invention relates to the loss of objects, specifically to a system having means to provide immediate notification of loss.

BACKGROUND

Existing approaches typically address the tracking and locating of already lost objects but do not address the moment of loss itself. Object finders, such as key finders, suffer from being limited to single categories of items such as keys, and moreover require dedicated finder devices that tend to be cumbersome and that are often lost themselves. Object loss, typically of small items, is largely due to misplacement or forgotten placement of things such as a wallet or a set of house keys.

U.S. Pat. No. 7,095,325 shows a system for identifying and informing passers-by that an asset is lost. Asset tags contain identity information and audio playback mechanisms, and a means to synchronize with a base station. The asset tag informs passers-by that it is lost if it has not synchronized with the base station within a predefined period of time by emitting a personalised audible signal.

U.S. Pat. No. 7,084,764 shows a tethered tag system for monitoring objects across a large physical area, for example a building. Strap-based tags raise an alarm when removed from the objects they have been tethered to.

U.S. Pat. No. 7,015,817 describes tracking of individuals whereby a tracking device is tethered to an individual and monitored by means of a wireless network.

There is therefore a need for a means of monitoring for the loss of small items and of notifying a person of that loss.

SUMMARY OF THE INVENTION

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

There is provided a method of monitoring for proximity of items, comprising monitoring for reception of a wireless signal from one or more wireless devices; upon reception of a wireless signal from one or more wireless devices, ascertaining the identity of a wireless device from which the wireless signal was received; comparing the identities of wireless devices from which responses have been received to a predetermined list of wireless devices; and generating an alert if a signal was not received from one or more wireless devices in the predetermined list.

The method may additionally comprise the step of transmitting a signal for reception by one or more predetermined wireless devices, wherein the step of monitoring for the reception of a wireless signal is performed by monitoring for the reception of a wireless signal from the one or more predetermined wireless devices.

The method may be performed by a mobile station.

The received signal may comprise the identity of the wireless device transmitting that signal.

The signal may be transmitted using a short-range wireless communications system.

The signal may be transmitted using the Bluetooth protocol or the RFID protocol.

The wireless device may be a Bluetooth module or an RFID module.

The wireless device may comprise a wireless communications system and a power system to power that communications system.

The power system may comprise a generator.

The generator may convert movement or solar energy to electrical energy.

The predetermined list may comprise devices entered by the user of the device performing the method.

The method may provide a method of monitoring a person's possessions.

The wireless device may be configured to be attached to an item of personal property.

There is further provided, a method of monitoring for proximity of items, comprising monitoring for reception of a wireless signal from one or more wireless devices; upon reception of a wireless signal from one or more wireless devices, ascertaining the identity of a wireless device from which the wireless signal was received; calculating an indication of the distance between the device performing the method and the wireless device from which the signal was received; comparing the identities of wireless devices from which responses have been received to a predetermined list of wireless devices; and generating an alert if the calculated distance is greater than a predetermined distance.

The distance may be calculated based on the strength of the received signal.

There is further provided a method of monitoring the location of items, comprising receiving information identifying a wireless device and information indicative of the location of that wireless device; ascertaining the identity of a user related to the wireless device; and transmitting a signal to the user comprising information indicative of the location of the wireless device.

There is also provided a system for monitoring the location of items, comprising a wireless communication terminal, configured to ascertain the identity of wireless devices within range of the terminal, a processing system in communication with the terminal, configured to receive identities from the terminal and to ascertain the identity of a user associated with a received identity and to transmit an alert to that user in response to receiving a signal from a terminal comprising that identity.

The processing system may comprise a database relating user identities to wireless device identities.

The database may further comprise mobile station identities corresponding to user identities, and wherein the alert is transmitted by transmission of a message to a mobile station corresponding to the identified user.

There is also provided a method of monitoring for the proximity of items, comprising monitoring for the reception of a wireless signal from one or more wireless devices; upon reception of a wireless signal from one or more wireless devices, ascertaining the identity of a wireless device from which the wireless signal was received; transmitting a signal to a processing system, wherein the signal identifies the wireless devices from which a signal has been received; at the processing system, identifying the identity of a user to whom the wireless device is related; and transmitting an alert to the user.

There is further provided a method of cooperatively monitoring for proximity of items, comprising at least two mobile stations monitoring for reception of a wireless signal from one or more wireless devices; upon reception by a first of the mobile stations of a wireless signal from one or more wireless devices, ascertaining the identity of a wireless device from which the wireless signal was received; and comparing the identified wireless device to a predetermined list of wireless devices, wherein the predetermined list comprises wireless devices corresponding to the first and a second mobile station.

The method may further comprise transmitting a signal from the first mobile station to the second mobile station if a signal has not been received from any of the wireless devices in the predetermined list corresponding to the second mobile station.

The method may further comprise transmitting a signal to the second mobile station if a signal is received from one or more wireless devices in the predetermined list corresponding to the second mobile station.

The method may further comprise transmitting information comprising the identity of wireless devices to be monitored from a first mobile station to a second mobile station.

A network for monitoring of location of items according to an exemplary embodiment of the present invention comprises: a plurality of wireless devices, each of the plurality of wireless devices being associated with a monitored item; a plurality of mobile stations, each of the plurality of mobile stations being associated with a respective user and configured to generate an alert when at least one respective wireless device of the plurality of wireless devices exceeds a location parameter; and a processing system that is in communication with the plurality of mobile stations, the processing system comprising a database that collects and stores data related to the plurality of wireless devices and the plurality of mobile stations.

In at least one embodiment, the database is a dynamic database.

In at least one embodiment, the system further comprises a base station that receives data relating to the plurality of wireless devices and forwards the data to the processing system.

In at least one embodiment, the collected data comprises data relating to at least one of the following: time of day the wireless device exceeds the parameter, location at which the wireless device exceeds the parameter, and the frequency at which the wireless device exceeds the parameter.

In at least one embodiment, the processing system further comprises a learning module that uses the collected data to provide at least one service to a respective user.

In at least one embodiment, the at least one service comprises providing a user default profile generated based on the collected data, the user default profile defining the parameter.

In at least one embodiment, the at least one service comprises providing an option to not generate the alert when the wireless device exceeds the parameter.

In at least one embodiment, the alert comprises a notification to the user through the mobile station, and the at least one service comprises allowing a user to select a method of providing notification.

In at least one embodiment, the method of providing notification comprises at least one of the following: an alarm generated by the mobile station and vibration of the mobile station.

A computer-based method for monitoring of location of items according to an exemplary embodiment of the present invention comprises the steps of: providing a plurality of wireless devices, each of the plurality of wireless devices being associated with a monitored item; configuring each of a plurality of mobile stations to generate an alert when at least one respective wireless device of the plurality of wireless devices exceeds a location parameter, each of the plurality of mobile stations being associated with a respective user; and collecting and storing, using a processing system that is in communication with the plurality of mobile stations, data related to the plurality of wireless devices and the plurality of mobile stations.

BRIEF DESCRIPTION OF THE DRAWINGS

Embodiments of the present invention will now be further described, by way of example, with reference to the drawings, wherein:

FIG. 4 shows a selection of exemplary uses of the wireless devices of FIG. 2;

DETAILED DESCRIPTION OF PREFERRED EMBODIMENTS

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
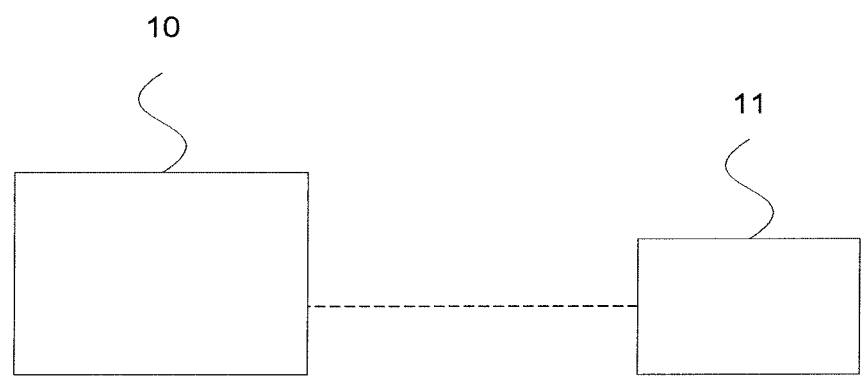
FIG. 1 is a diagram of components of an embodiment of the invention.

FIG. 1 shows a system for providing wireless monitoring of items. The mobile station 10 comprises a wireless communications system to allow communications with remote devices, such as a wireless device 11. Mobile station 10 also has other systems to perform its principle function, for example telephony functions if the mobile station is a mobile telephone. Mobile station 10 may be a mobile telephone, PDA or any other wireless enabled mobile device, such as, for example, a BlackBerry® or an iPhone®. The wireless device 11 is for attachment to portable items and the term 'patch' will be used herein to refer to the wireless device 11. The wireless communication system may be provided by any known means providing the functionality set out herein, for example a Bluetooth system.

Figure 2:
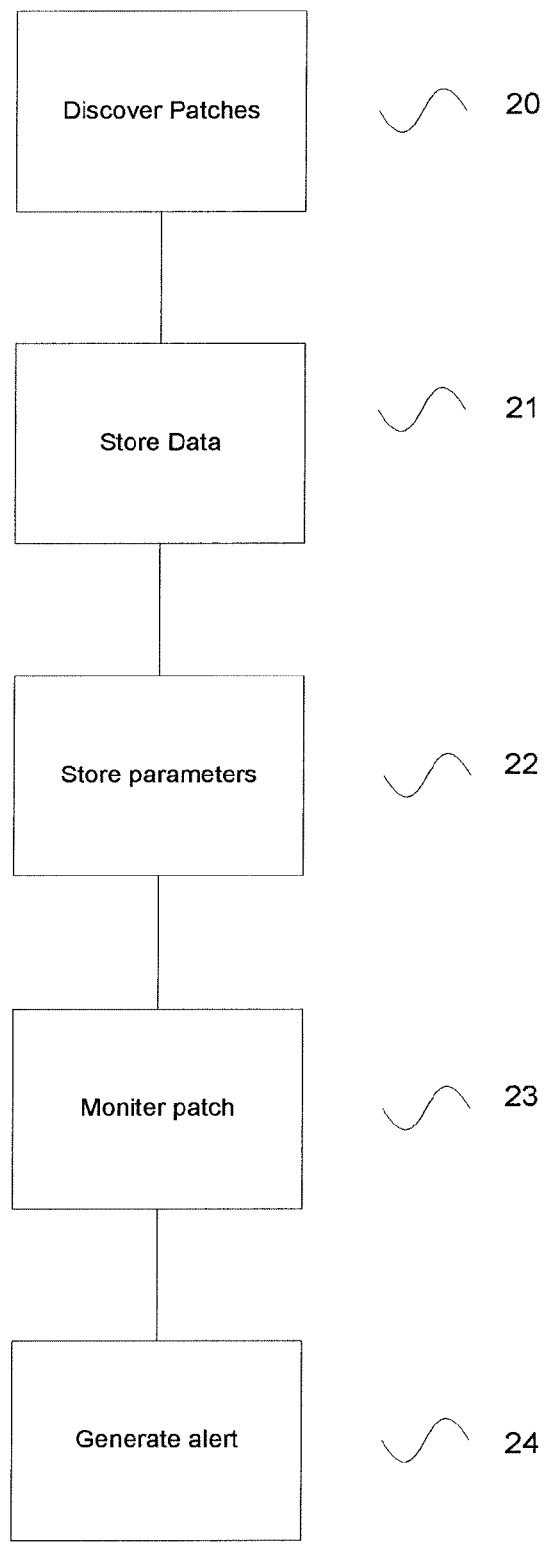
FIG. 2 is a flow chart of an overview of a method according to an embodiment of the invention.

FIG. 2 shows an overview of a method of configuring and utilising a system for monitoring the proximity of items. At step 20 a mobile station identifies patches for monitoring. At step 21 data related to the patches is stored in the mobile station, for example the identity of the patches and optionally the items to which each is attached. At step 22 data may be stored defining parameters relating to the monitoring of the patches, for example parameters defining the thresholds for activating alerts when monitoring the patches. These steps may alternatively be performed as a single step in the process or partitioned in other ways. A user may enter the parameters, or they may be values stored or generated by the mobile station.

At step 23 the mobile station monitors the identified patches in relation to the stored parameters. At step 24 the mobile station generates an alert if the monitoring step identifies a patch has met one or more of the stored parameters. For example, an alert may be generated if the proximity between the mobile station and the patch meets or exceeds a threshold figure. There is thus provided a method to alert a user of the mobile station as soon as an item moves out of proximity with their mobile station, thereby immediately indicating them of a possible loss.

Figure 3:
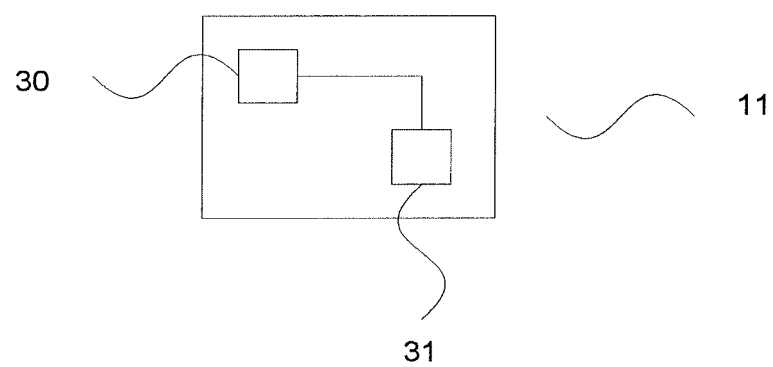
FIG. 3 is a diagram of a wireless device.

As shown in FIG. 3, patch 11 comprises a wireless communications system 30 and a power source 31. Patch 11 has a unique identity, which can be transmitted by the wireless communications system 30. The unique identity may also be physically marked on the patch in a human readable form. The wireless communications system may comprise a hardware device including firmware or software to provide the required functionality. Alternatively, a separate processing device may be provided in the patch to provide the required functionality. The patch 11 is designed to be attached to small personal items and is provided with attachment means to allow attachment to items such as a wallet or keys. For example, the device may have a width and length of approximately 25 mm and may be provided with a self-adhesive surface for attachment to the item. Other sizes and configurations may be provided for use with different sized items. FIG. 4 shows a number of exemplary uses of patches.

Patches may also be provided as part of the item, rather than a separate device. For example, a wallet may be provided with a patch integrated into the lining. Furthermore, for devices having a power source, that power source may also power the patch.

The wireless system 30 of the patch 11 is configured to communicate with a mobile station 10. The communications between the mobile station 10 and the patch 11 may be limited to the patch 11 transmitting its identity to a mobile station, or may allow other information and instructions to be communicated. Patches may be configured to communicate with any mobile station within range, or may be configured to only communicate with designated mobile stations.

The mobile station is configured to monitor one or more parameters of a communications link between the mobile station and one or more patches and alert a user of the mobile station when a patch moves outside of a predetermined distance from the mobile station. Movement outside of that predetermined distance may be detected by an inability of the mobile station to communicate with the patch via the communications link, or by a parameter of the communications link moving outside of a threshold. Since a mobile station will typically be retained on a user's person, there is therefore provided a system to alert a user when an item is lost. The term 'communications link' is used herein to describe communications between two items in general, and does not require there to be a continuously maintained link. For example, the communications link may be provided by the intermittent transmission of messages. For clarity, when a patch item is within a predetermined distance of a device monitoring the patch such that an alert is not raised, it will be described as being in proximity to the mobile station.

Figure 5:
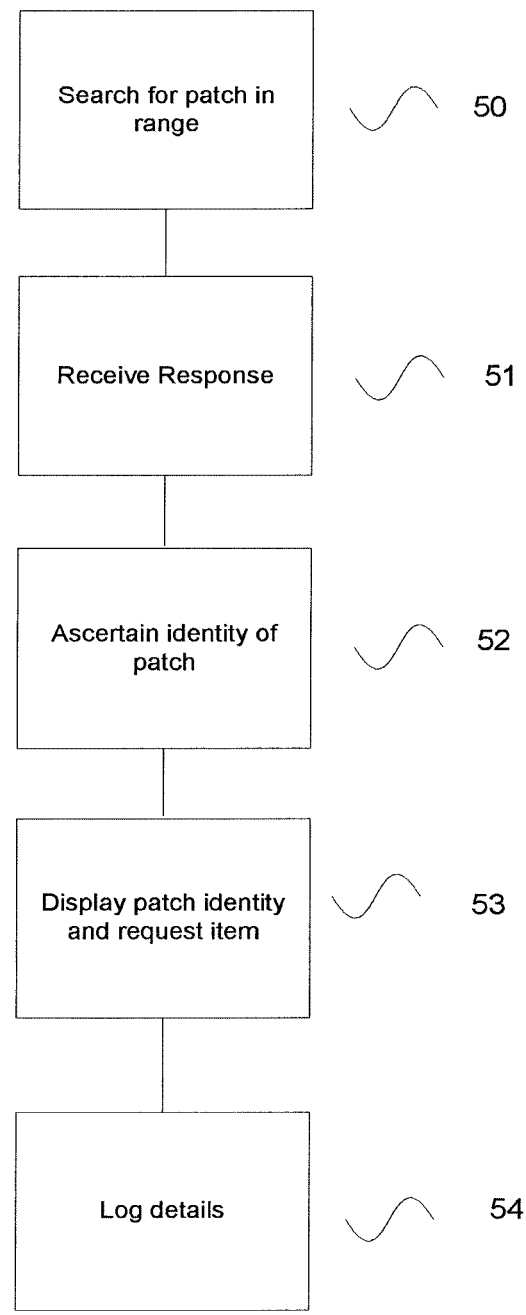
FIG. 5 is a flow chart of a method of identifying patches.

FIG. 5 shows a flow-chart of a method of relating one or more patches to a mobile station. For the purposes of clarity, the method is described in relation to a single patch, but as will be apparent the method can be applied with simple modifications to the configuration of multiple patches either serially or in parallel.

At step 50 the mobile station performs a search procedure for patches within range. For example, the mobile station may transmit a poll command which causes all patches that receive that command to transmit a response to the mobile station. Upon receiving a response from a patch at step 51 the mobile station ascertains the identity of the patch at step 52. That identity may be received as part of the initial response from the patch, or may be requested in further communications between the mobile station and the patch.

At step 53 the mobile station identifies the detected patch to the user (for example by displaying its identity) and the user is requested to enter details of the item to which the patch is, or will be, attached. Entry may be performed by, for example, typing details of the item on a keypad of the mobile station or selecting from a list of standard items. By entering the item to which a particular patch is attached any alert to the user can be made more specific, but the step is optional and the methods described herein are still operable without the user entering details of the item. At step 54 the mobile station stores details of the patch and the item to which it is attached for later reference. The data relating to the patch may be stored in a database on the mobile station, or in any suitable storage format. After completion of this method, the mobile station is aware of the identity of the patch, how to communicate with it and details of the item to which it is attached.

As further optional steps the mobile station may also configure further settings in relation to the patch. For example, the predetermined distance above—which an alert is raised may be set, or the frequency with which the patch is monitored may be set.

Mobile stations and patches may be made available which are already related to each other, in which case the methods described above would not be required and the patches and mobile stations would be immediately ready for use.

Figure 6:
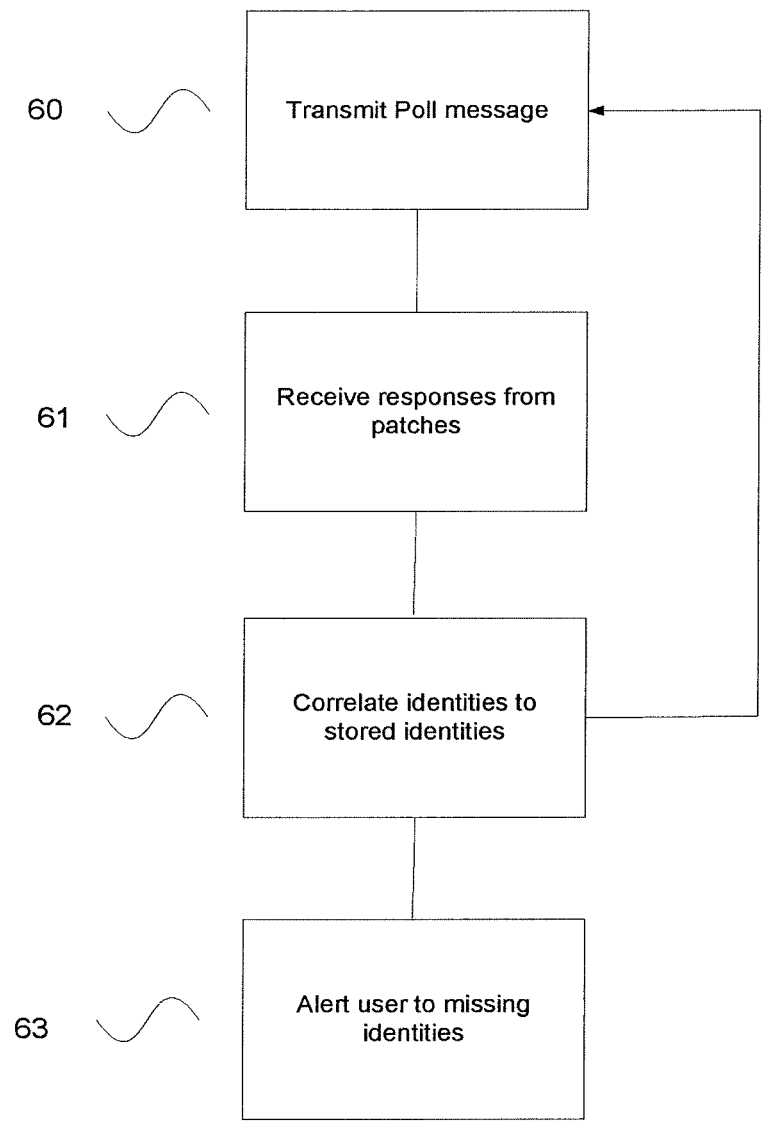
FIG. 6 is a flow chart of a method of monitoring patches.

FIG. 6 shows a flow-chart of a method of monitoring the proximity of patches. At step 60 the mobile station transmits a poll message which requests all patches receiving the message to respond. At step 61 the mobile station receives responses from those patches within range and ascertains the identity of each of the patches of the responses.

At step 62 the identities of the patches that responded to the poll are checked against the identities of patches related to the mobile station during the set-up process, which process has been described in relation to FIG. 5. If all of the related patches respond to the poll message, the method returns to the polling stage and the is repeated at a predetermined time interval. The predetermined time interval may be set by the user, or stored in the system, and may range from immediately to any required time interval. The time interval selected will be dependent upon, for example, battery power consumption requirements and the speed with which notification of loss is required. More frequent monitoring will lead to greater battery consumption, but faster notification of loss. If any of the related patches did not respond to the poll message, an alert is issued at step 63 to the user indicating the patch is not in proximity to the mobile station. The alert may be in any suitable form, for example by the mobile station ringing and displaying a message stating the reason for the alert. If the item to which the particular patch has been attached was stored during the set-up process then that item may be identified to the user. The user is thus alerted that one of their patched items has moved outside of proximity with the mobile station and may therefore be lost. Furthermore, the alert may be transmitted to a third party.

The poll message used to ascertain the proximity of patches may take a variety of forms, for example it may be a general broadcast message requesting all patches to respond, or a series of messages may be directed in turn to each of the patches related to the mobile station such that only the addressed patch responds. The latter may be beneficial to avoid the mobile station receiving a large number of responses from patches not related to the mobile station.

As has been described above, the mobile station provides services in respect of discovering patches, storing data relating to those patches, monitoring the patches and generating alerts in response to the monitoring. Those services may be provided by software or firmware provided on or loaded onto the mobile station. For example, the software may be downloaded from a remote site via a network connection, or may be loaded via a data carrier. Furthermore, the functionality may be pre-installed on the device during manufacture.

In the method above, the patches respond to a mobile station in response to a poll message from the mobile station. Alternatively, the patches may continuously transmit their identity for reception by the mobile station. If the patches operate in this manner the mobile station does not need to broadcast a polling message, but can listen for transmissions by the patches identified to it during set-up. Similarly, during the setup process described above, the mobile station does not need to poll for patches, but can listen for patches transmitting.

As has been described above, the patches are attached to items of property. The patches should be capable of independent operation for extended periods of time without requiring attention, for example charging. Power may be provided by any suitable means. A battery may be provided to directly power the system, and a charging system also provided. The charging system may be a power input connection, or could be a means of generating power, for example a solar system or movement based generation system. Furthermore, the charging system could be an induction based, or similar, system such that the battery can be recharged without requiring connection to an external device, but can simply be brought into proximity with a charging system. Alternatively, patches may be powered by a power system of the item to which they are attached.

In the above-described methods, proximity is detected by transmitting a poll message from the mobile station and detecting whether a response is received from the patch. The range of the wireless system employed therefore defines the threshold for generation of any alert. By varying the range of the system the threshold may be varied. For example, the transmit power of the mobile station may be altered to vary the proximity threshold.

In alternative methods of detecting proximity, the distance between the mobile station and the patch is estimated and compared to a threshold. The threshold may be defined by the user during the set-up process or be pre-configured by the system. The threshold may be defined differently for different patches. In an example system, the distance may be determined by Received Signal Strength Indication (RSSI), which uses measured power and signal quality to infer distance. Determination of an absolute distance may be difficult, and therefore the threshold may be determined on a unit-less scale that is proportional to distance, but is not measured in a defined unit. References throughout this document to a distance or a predetermined distance should be read as references to a general indication of distance, and not to an absolute distance in a particular unit of measurement.

The wireless communications system can be any suitable system. For example the Bluetooth radio standard may be convenient as it is a standard system provided in many mobile station products. Other standards, for example RFID, are also applicable.

The above-description has been in relation to the monitoring of patches by a single mobile station. Additional functionality can be provided by the system shown in FIG. 7 in which two mobile stations 70, 71 are each configured to monitor at least one respective patch 72, 73. If mobile stations 70, 71 are brought into proximity to one another, communications may be established between them via a wireless communications system.

Figure 7:
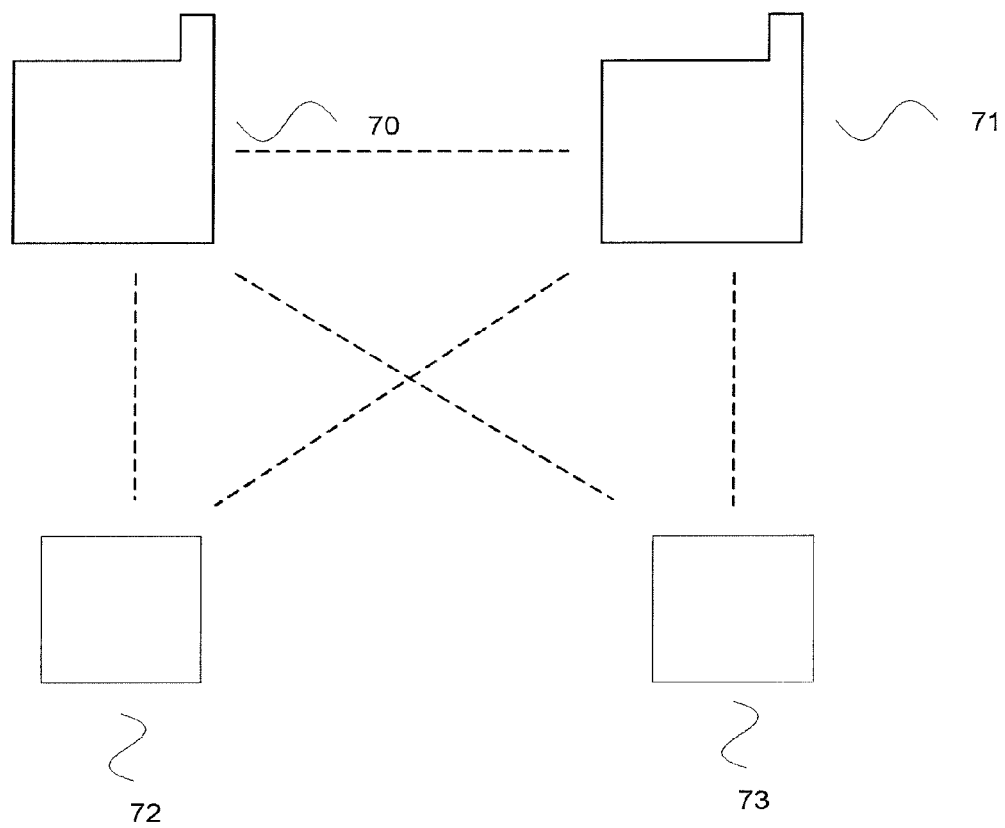
FIG. 7 is a diagram of mobile stations operating in a buddy mode.

Once communications have been established, the mobile stations may be configured to be 'buddies' and each may monitor the patches related to the other mobile station. Thus, mobile station 70 may monitor patch 73 as well as 72 and vice versa. FIG. 7 shows two mobile stations, each related to one patch, but the buddy system is applicable and operates in the same manner with any number of mobile stations and patches.

Only one of the mobile stations needs to be configured to monitor patches. That mobile station may buddy with another mobile station to use it as a terminal to provide another monitoring point for patches. In that situation, the first mobile station would perform the processing and the second mobile station would accept instructions and pass information between the first mobile station and the patch.

When establishing a buddy arrangement, functionality may be provided on the mobile station to allow the user to accept or decline certain buddies and to configure the manner in which the relationship operates. For example, a user may wish to only buddy with another mobile station in respect of certain patches (e.g. wallet and laptop), but not others (e.g. passport) to which it is related. When more than one mobile station is monitoring a patch, it is possible to calculate a location of a patch based on the link parameters for each of the mobile stations to that patch. For example, if two or three stations are monitoring a patch proximity information from each device may be utilised to biangulate or triangulate the position of the patch. Furthermore a GPS receiver, or other positioning device, provided as part of a mobile station could be utilised to provide an actual location of the patch rather than a relative indication of location.

Figure 8:
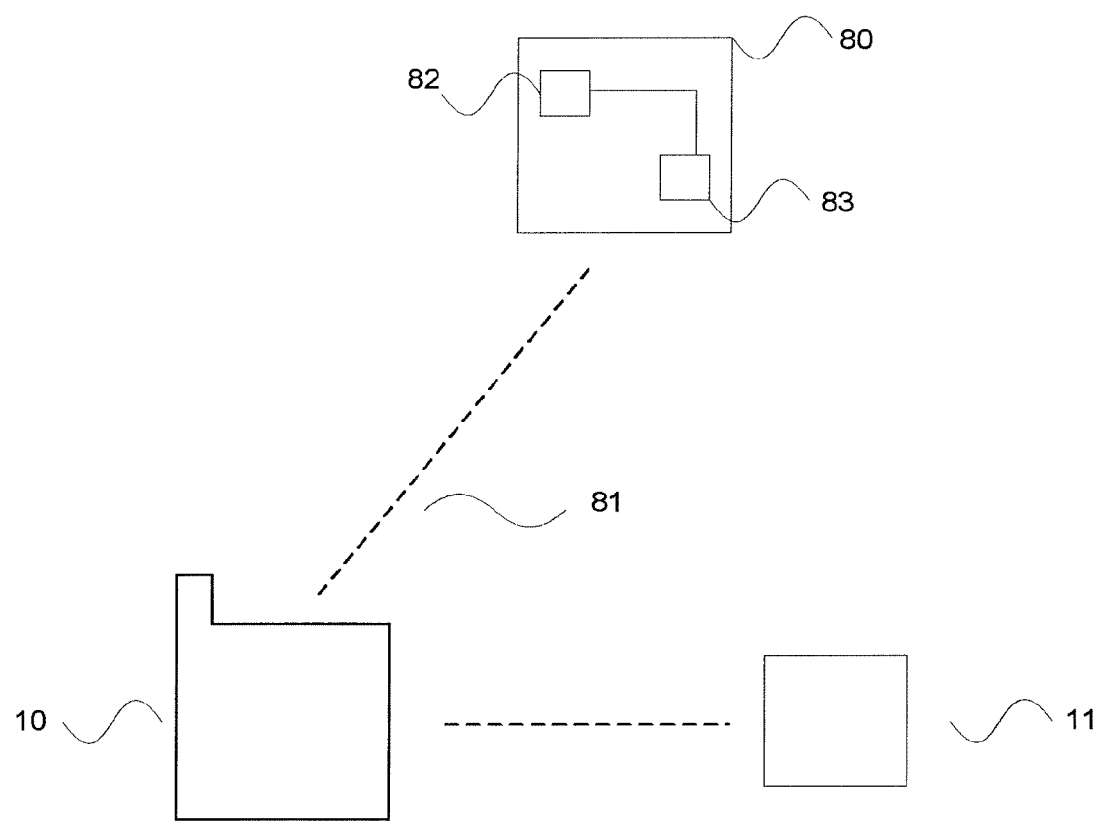
FIG. 8 is a diagram of a system comprising a processing system and database according to an embodiment of the invention.

FIG. 8 shows a further system according to the invention. Mobile station 10 and patch 11 are as described hereinbefore. Processing system 80 is capable of communicating with mobile station 10 via a communications link 81. A mobile telephony network or other system may provide link 81. Processing system 80 comprises a database 82 and processing means 83 for accessing and maintaining that database. Processing system 80 may be provided according to any known method for providing a database and access thereto.

Database 82 stores records relating to mobile stations and patches. For example, the identity of mobile stations and patches, and the relationships between them may be recorded. Further information may also be recorded, for example a record of the items to which each patch is attached or an identity of a user related to the mobile stations. The processing system 80 may be utilised to provide additional services related to the item monitoring services described above.

As will be appreciated, there are many possible methods of identifying and storing the identity of patches and mobile stations. One possible method is to utilise three unique identity sets. Firstly, a unique user identity is assigned to each user of the system. Secondly, each mobile station has a unique station identity and each mobile station may be related to one or more user identities. Thirdly, each patch has a unique patch identity, each of which may be related to one or more mobile stations. This structure of identities may be convenient as it allows, for example, one user to maintain more than one mobile station, or for one mobile station to be related to more than user, for example in the case of a shared device. The database may also store other data relating to patches and mobile stations. For example, an indication of the item having been recorded as stolen. If the patch relating to an item marked as stolen is subsequently detected and that detection is reported to the processing system, an alert can be raised. The database could also be utilised to return lost items to their owner by checking lost items for patches and then ascertaining the identity of the items owner from the database.

The database of system 80 may be updated on a continual or interval basis. For example, mobile station 10 may transmit details of all of the patches it is in communication with to system 80, which records those details. Should mobile station 10 be lost or broken, system 80 could be utilised to restore the operation of the item monitoring system on a replacement mobile station by transmitting the relevant details under the instruction of the user.

Details of patches that are detected by a mobile station, but that are not related to that mobile station, may be transmitted to, and logged by, the processing system 80. That data could be utilised to construct a map of users' items and mobile stations that have come into proximity with one another. Such data may be used for, for example, social networking.

The database of identities may also be utilised to disable a mobile station in the event that its owner loses it. The database maintains a record of the relationship of users and mobile stations and the system can communicate with each mobile station. In the event that a user reports a mobile station as lost, the processing system may transmit a message to the mobile station to cause the mobile station to 'self destruct'. For example, the software residing on the mobile station may delete all user records, e.g. contact details, or the mobile station may be disabled completely from use.

Figure 9:
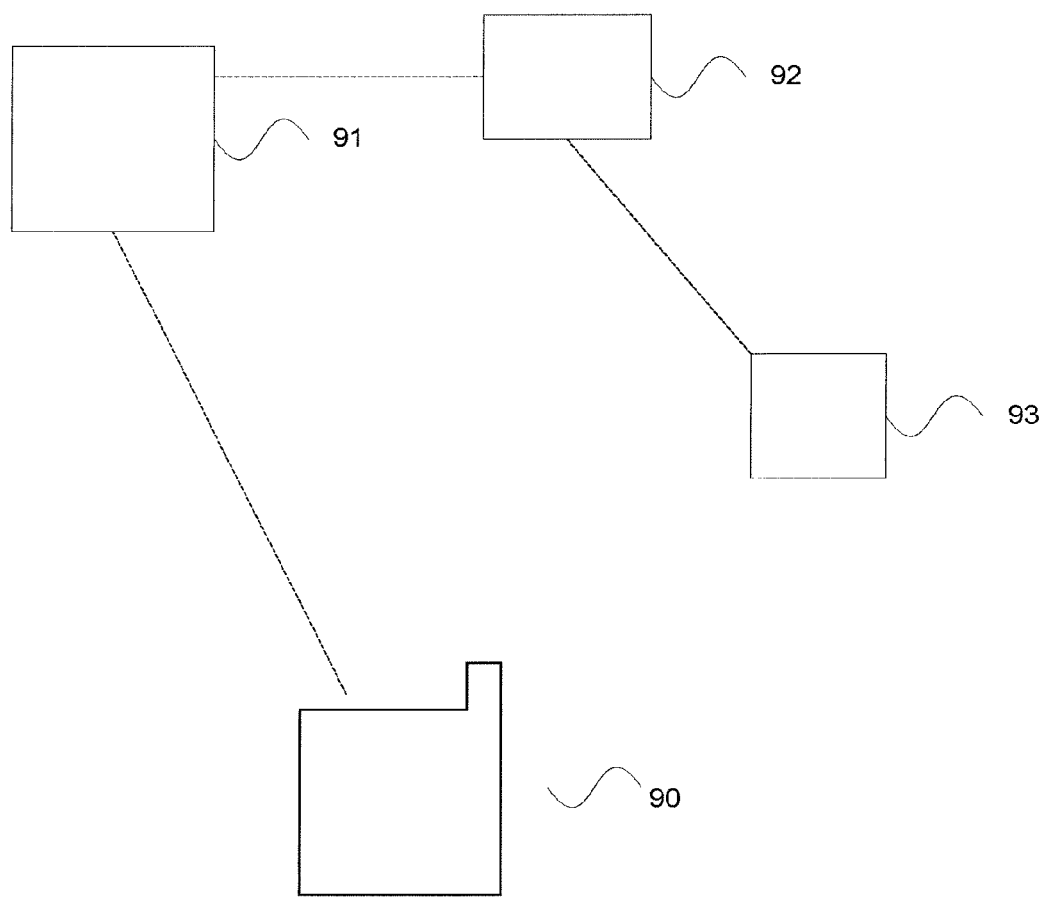
FIG. 9 is a diagram of a system comprising a base station according to an embodiment of the invention.

FIG. 9 shows a further system for monitoring devices. Mobile station 90 is configured to monitor one or more patches as has been described previously. Mobile station 90 is in communication with processing system 91, which maintains a database as has been described above in relation to FIG. 8. The system 91 is in communication with a base station 92 that is configured to monitor for patches 93 coming within its range. Base station 92 operates in a similar manner to that described in relation to mobile stations above, in that it polls for patches in proximity to the base station and ascertains the identity of patches that respond to that polling. However, the base station 92 may not be programmed with the identity of specific patches, but is configured to pass the identity of patches, that respond to the polling message to system 91.

Figure 10:
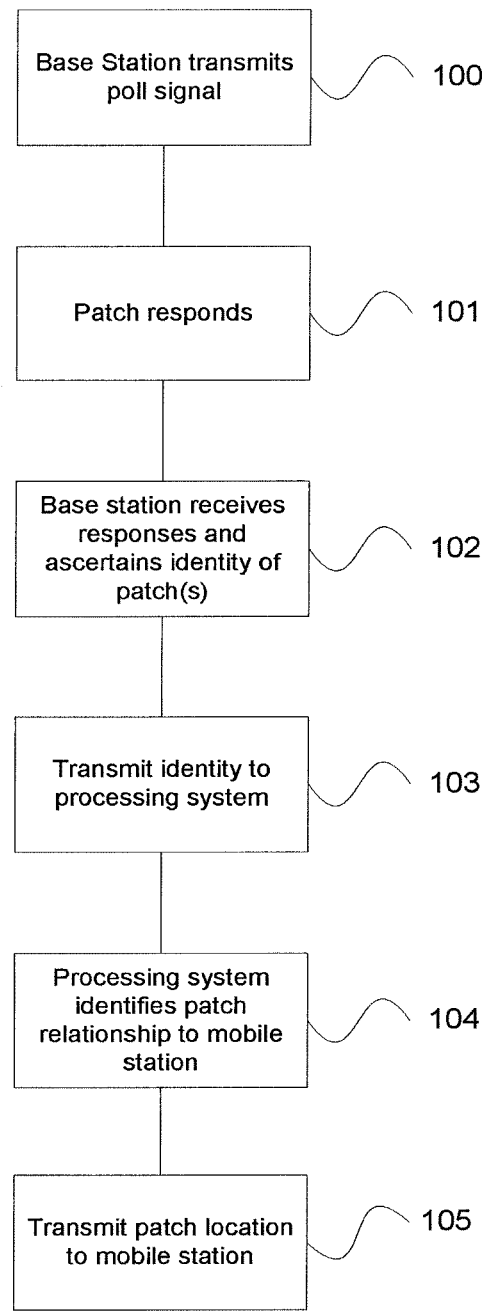
FIG. 10 is a flow-chart of a method of monitoring objects.

FIG. 10 shows a flow-chart of a method utilising the system of FIG. 9. At step 100 base station 92 transmits a polling message to cause any patches receiving the message to respond. At step 101 any patches receiving the polling message transmit a response for reception by the base station 92. At step 102 the base station receives any responses and ascertains the identity of patches from which responses are received. The identity may be ascertained from data transmitted by the patch, or may be identified by the transmission and receipt of further messages between the base station 92 and the responding patch.

At step 103 the base station 92 transmits the identity of the patch 93 to the processing system 91 together with an indication of the identity of the base station, for example its location. The processing system 91 receives the patch identity and at step 104 utilises its database of identities to ascertain the identity of the mobile station 90 to which the patch 93 is related. At step 105 the identity of the patch is transmitted to the relevant mobile station 90, together with an indication of the location of the patch. The location of the item to which the patch is attached is thus notified to the owner of that item.

The polling of step 100 may be performed on a continual basis, or at some predetermined time interval. The transmission of identities to the processing system may be performed in a manner relevant for the particular service being provided. For example, the identity of patches may only be transmitted when they are first detected, or the identity may be transmitted at intervals while the patch remains in proximity to the base station. Also, the identity of patches may be transmitted when they are first detected, and then when it is observed by the base station that the patch is no longer in proximity to the base station, together with an indication that the patch has arrived in or left proximity. The processing system 91 may then transmit a suitable message to the mobile station 90.

More than one base station may be provided, wherein the areas of proximity for each base station overlap. By monitoring for the proximity of patches and calculating distances between each base station and a patch, the position of the patch can be estimated with greater accuracy than would be possible with a single base station. For example, triangulation using signal strength indications from three base stations may be utilised to estimate the position of a patch.

The system and method of FIGS. 9 and 10 may be utilised to provide a wide range of services. Examples immediately below are only indicative of the types of service that may be provided.

Figure 11:
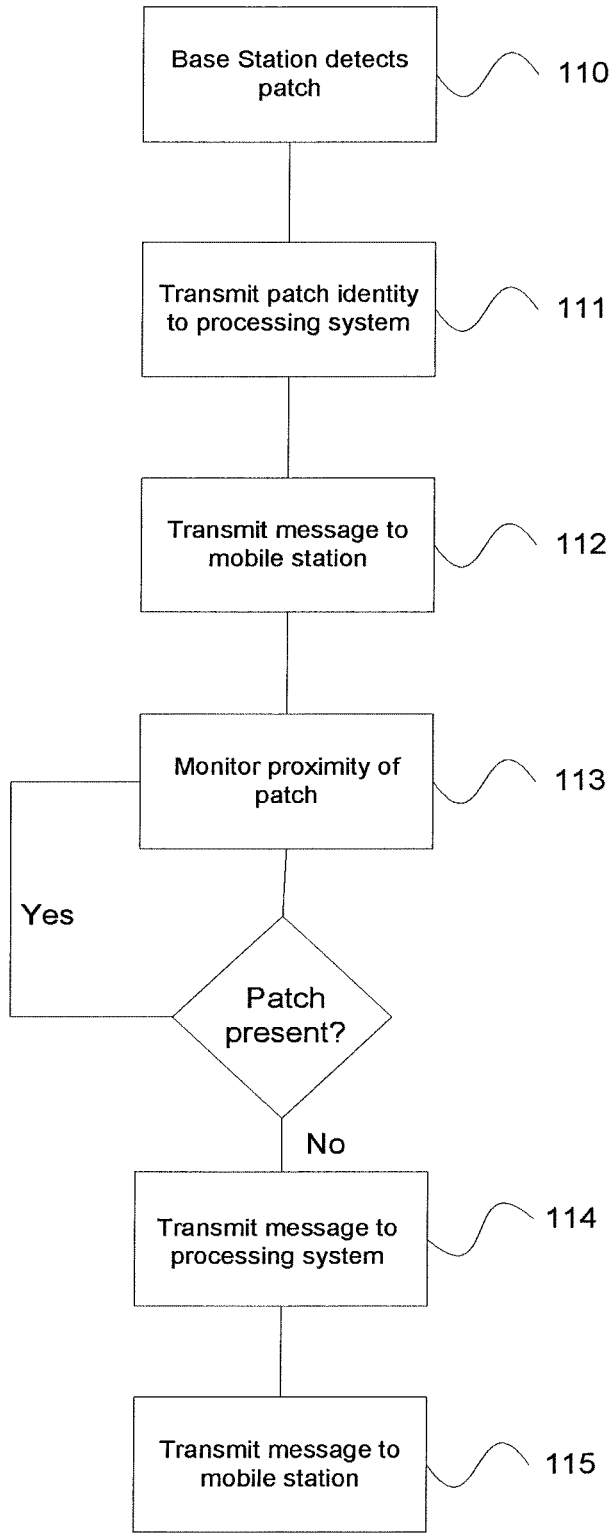
FIG. 11 is a flow-chart of a method of monitoring a left-items area.

FIG. 11 shows a flow-chart of a method of providing an item monitoring service in an establishment. For example, the service may be provided by a restaurant to monitor items placed in their left items room.

At step 110 an item equipped with a patch is deposited in the left items room of the establishment and its proximity to the base station is detected by the base station. At step 111 the base station transmits the identity of the patch to the processing system. At step 112 the processing system transmits a message to the mobile station related to the patch indicating that the patch has been detected. At step 113 the proximity of the patch is monitored by the base station, and providing the patch remains in proximity no action is taken and the monitoring continues.

If it is detected that the patch has moved out of proximity with the base station a message is transmitted at step 114 to the processing system. At step 115 the processing system transmits a message to the related mobile station indicating that the item has moved out of proximity. If the person to whom the patch relates has removed the item, then the message can be ignored. However, if the person had not removed the item and assumed it was still located in the left items room, it is an indication that the item has been taken without permission and action can be taken.

The messages transmitted at steps 111 and 112 may be omitted, in which case the person may simply assume that the patch has been detected. A message would thus only be transmitted when the item is removed, which is the action of importance to the user, thereby reducing the messaging requirements of the system. Furthermore, a message may be transmitted by the mobile station querying where a patch is. The processing system will report to the mobile station if the patch is in proximity to a base station.

The base station may also be configured to detect the proximity of mobile stations, and to transmit the identity of mobile stations detected to the processing system. Such detection may allow the provision of further services. For example, in the method of FIG. 10, a mobile station related to a patch being monitored by the base station may be detected by the base station prior to the removal of a patch from proximity. This may be considered an indication that the item has been removed by the owner of that item (since the mobile station, and hence owner, was present when the item was removed) and hence the message indicating the removal of the item may be omitted.

Figure 12:
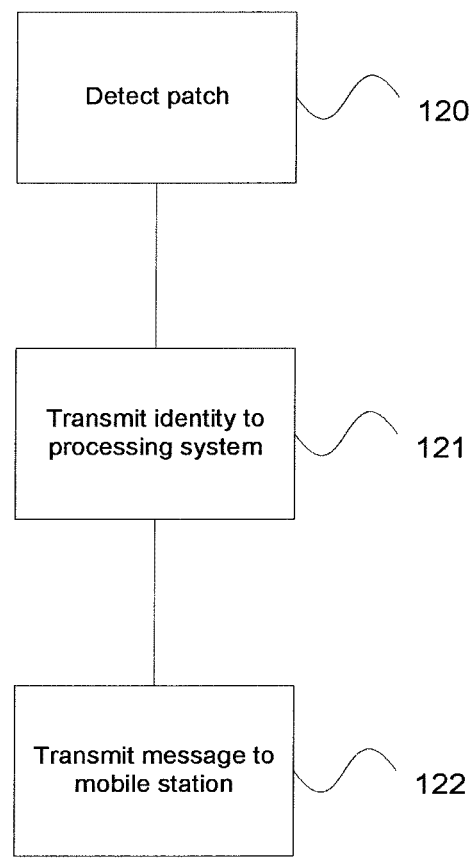
FIG. 12 is a flow-chart of a method of locating objects.

FIG. 12 shows a flow-chart of a further example of an exemplary service. The base station is located in a luggage handling area of an airport such that items of luggage being handled move into proximity with the base station. At step 120 a patch is detected in proximity and at step 121 its identity is transmitted to the processing system. The processing system ascertains the identity of the mobile station related to the patch and at step 112 transmits a message to the mobile station indicating the detection of the patch. The user is thus made aware of the location of their luggage, and in particular that it has left the aircraft and is on route to the collection area. More than one base station may be provided at various points in the luggage handling system such that progress of the luggage may be monitored and reported more accurately to the owner.

In further methods, the mobile station and processing system may be configured such that a user can notify the system of items that have been lost. Should one of the lost items be detected by a further mobile station or base station and reported to the processing system, the processing system can then notify the user of the location of their item thus improving the chances of returning the item to the user. To facilitate this service, lost-luggage locations, for example at stations or airports, could be equipped with a base station to report all items with patches that are in the lost luggage area to the processing system.

In a further exemplary service the systems and methods described above may be utilised to facilitate the delivery of medical records to hospitals or other treatment locations in the event of an accident. The treatment location may be provided with a base station which is configured to detect the proximity of patches. When a patch is identified in proximity to that base station the identity of the patch may be transmitted to a processing system. If the holder of the detected patch is subscribed to the relevant service that holder's medical details may be transmitted to the treatment centre to facilitate any treatment required by the holder. Such a system may reduce the time required for medical staff to identify important characteristics of the accident victim thereby improving the quality of the treatment they are able to provide.

For example, if the accident victim is unconscious or unable to respond, this system may enable vital information such as blood group or medical histories to be communicated immediately to the medial staff. The medical information could be stored in the processing system database, together with the patch and mobile station information as described above, or alternatively the processing system may simply act as a communications provider between a medical records store and the treatment centre. The treatment centre may be a hospital, doctor's surgery or a mobile location, for example an ambulance. In addition to providing medical information this system may also provide a simple route to the medical staff ascertaining the identity of the accident victim. Furthermore, other information such medical insurance information could be transmitted if required and available for a particular person.

The systems described herein also allow the provision of ancillary services and benefits. For example, insurance companies may offer discounts based on a reduced likelihood of loss of items equipped and monitored with patches.

Throughout this document the word 'system' is intended to encompass any electronic system suitable for performing the tasks attributed to that system. For example, the systems may be provided by computing-based devices.

Figure 13:
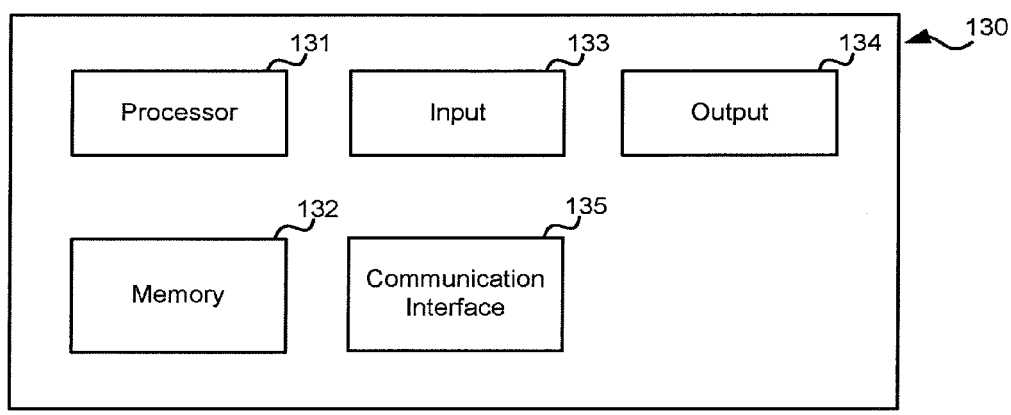
FIG. 13 is a diagram of an exemplary computing device.

FIG. 13 illustrates various components of an exemplary computing-based device 130 which may be implemented as any form of a computing and/or electronic device, and in which embodiments of the methods described herein may be implemented. The computing-based device 130 comprises one or more processors 131 which may be microprocessors, controllers or any other suitable type of processors for processing computing executable instructions to control the operation of the device. The computer executable instructions may be provided using any computer-readable media, such as memory 132. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Platform software comprising an operating system or any other suitable platform software may be provided at the computing-based device (e.g. stored in memory 132) to enable application software (which may also be stored in memory 132) to be executed on the device. The computing-based device may also comprise one or more inputs 133 and/or one or more outputs 134. The input 133 may be of any suitable type for receiving media content, Internet Protocol (IP) input, user commands etc. The output 134 may comprise an audio and/or video output to a display system integral with or in communication with the computing-based device. The display system (not shown in FIG. 6) may provide a graphical user interface, or other user interface of any suitable type although this is not essential. The device 130 also comprises communication interface 135 through which the device is connected to one or more other devices over a network and/or over point to point links. The elements 131-135 within the computing-based device are connected by means of a bus (not shown in FIG. 13).

Figure 14:
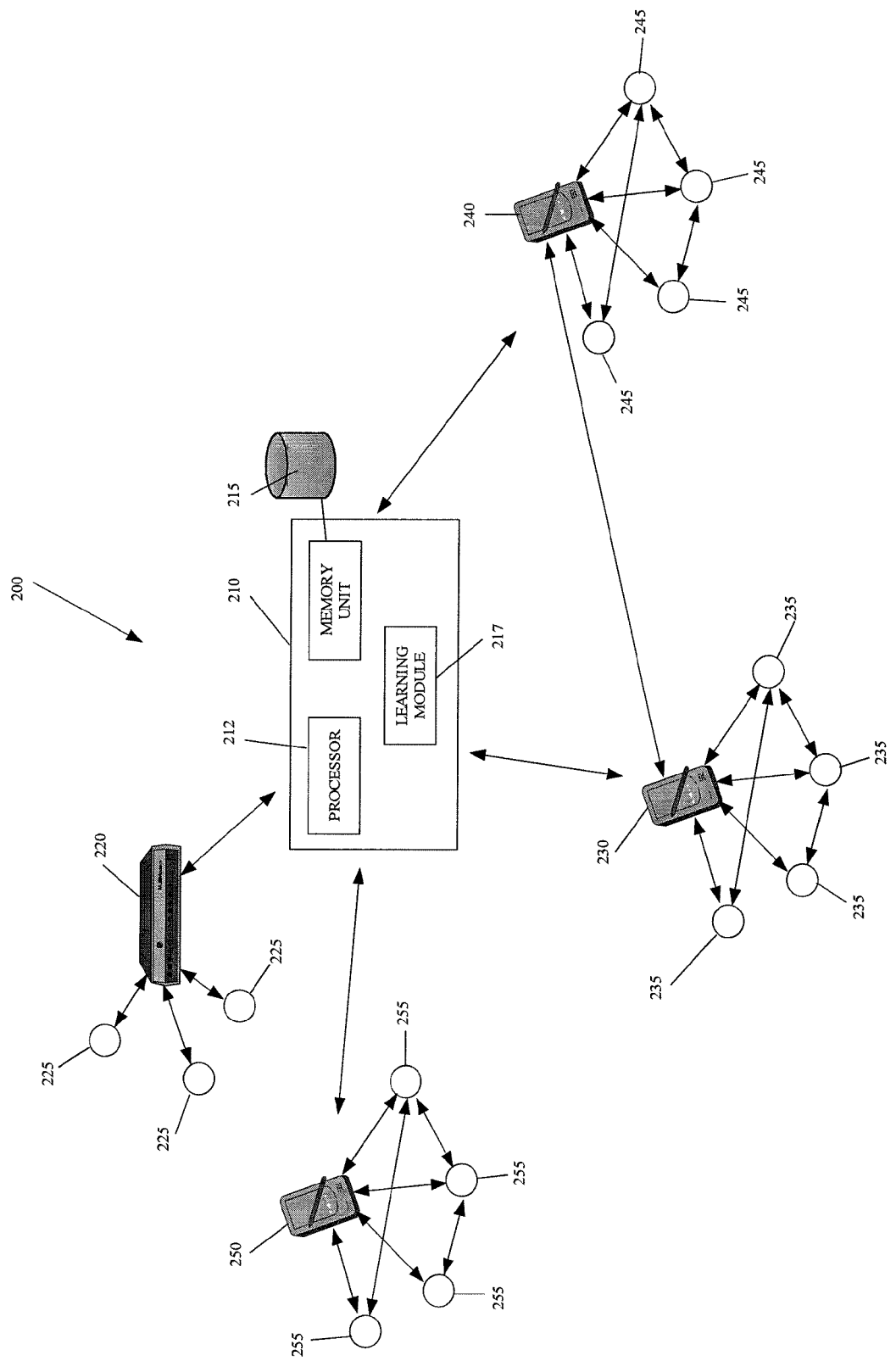
FIG. 14 is a schematic diagram of a network for device monitoring according to an exemplary embodiment of the present invention.

FIG. 14 is a schematic diagram of a network for device monitoring, generally designed by reference number 200, according to an exemplary embodiment of the present invention. The network 200 includes a central processing system, such as central server 210, and a base station 220, as described in previous embodiments. The central server 210 may include a processor 212, a memory unit, such as database 215, and a learning module 217. The network 200 may also include mobile stations 230, 240 and 250, and associated patches 235, 245 and 255. As described previously, the base station 220 may detect patches 225 and relay the detection to the central server 210, where the detected patches 225 may be matched to associated mobile stations 230-260. Also, the mobile stations 230-250 may be configured as "buddies" to one another. For example, the mobile stations 230 may be configured so as to monitor the patches 245 associated with mobile station 240, and in turn, the mobile station 240 may be configured so as to monitor the patches 235 associated with mobile station 230.

Any number of mobile stations may be included in a "buddy" network, so that items may be tracked over a wide network by a number of network members through their mobile stations. In this regard, the network 200 may include any number of mobile stations, patches and base stations. In exemplary embodiments, a network member may select certain items to be monitored by only specific other members within the network 200 by compiling a list of "friends" within the network 200, and assigning those "friends" to the specific items. Thus, the network 200 may function not only as a device monitoring network, but may also provide a social network that allows members to interact by sending messages to one another regarding each others items along with any other information.

Related to the 'buddies' feature, a lost item may be reported to the central server 210, and the central server 210 may generate an alert to all other users within the network. Thus, if the lost item is detected by any mobile station, the found item can be reported back to the owner of the item.

The central server 210 may collect user-set parameters and log statistics regarding the devices being monitored within the network 200. In this regard, the database 215 may collect and organize the appropriate metadata relating to users' behavioral characteristics. The learning module 217 of the central server 210 may use the data to "learn" usage patterns and build user profiles based on the known patterns. For example, the central server 210 may track the time of day, the location and the frequency at which a device oversteps a parameter, and based on this learned pattern, build a "default" profile for the user. The user can then choose to use the default profile, or, alternatively, generate and use a personal profile. The central server 210 may use the collected data to provide other options to the user, such as, for example, allowing notifications to be turned off at certain times of the day or customization of the notification process.

The data collected in the database 215 may be accessed by a user via the Internet. In this regard, the user may have the option to view a log of activity between patches 225, 235, 245, 255, mobile stations 230, 240, 250 and/or base station 220. This feature may allow a user to track certain items over a period of time so as to determine the optimal parameters in monitoring the item.

The patch 225, 235, 245, 255 may themselves be configured with appropriate software and/or hardware to allow them to communicate with one another. In this regard, each patch 225, 235, 245, 255 may be assigned an identification code that is known to match with a particular item. Thus, the patches 225, 235, 245, 255 may monitor one another, and generate alerts, such as an audio or visual alarm, when one of the patches 225, 235, 245, 255 exceeds a monitoring parameter. The patches 225, 235, 245, 255 may be also be configured to detect when a new patch comes within range of the patches 225, 235, 245, 255, and report the identification code of the new patch to the central server 210. This feature would allow reporting of a found device to a user.

Configuring the patches 225, 235, 245, 255 to communicate with one another allows the network 200 to operate without the need for a mobile station. In fact, the patches 225, 235, 245, 255 may be used to monitor one or more mobile stations. In this regard, a user may wear a patch on his clothing, for example, and the patch may be configured to alert the user when the distance of the user's cell phone from the user exceeds a set range.

A patch may broadcast its status as being lost, and the broadcast may be linked to the network 200 by, for example, a network user, an out-of-network user, or a Wi-Fi network. The patch's status may be reported to the network 200, and the network 200 may in turn report the found item associated with the patch to the owner of the item or a third party. The third party may be, for example, a security company that is contracted by the item owner to monitor the item. For example, the monitored patch may be fitted with an accelerometer, and placed on a window of the owner's house. If the window is opened, the owner may be alerted by the third party security company that a burglary may be in progress.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

What is claimed is:

1. A system for monitoring of location of items, comprising: a plurality of wireless devices, each of the plurality of wireless devices being associated with a monitored item;
 a plurality of wireless communication terminals, each of the plurality of wireless communication terminals being associated with a respective user and associated with at least one respective associated wireless device of the plurality of wireless devices and configured to monitor the proximity of the at least one respective associated wireless device and to generate an alert when the proximity of at least one of the associated respective wireless devices from the associated wireless communication terminal meets or exceeds a proximity threshold to alert the respective user to the met or exceeded proximity threshold; and
 a processing system that is in communication with the plurality of wireless communication terminals, the processing system comprising a database that collects and stores data related to the plurality of wireless devices and the plurality of wireless communication terminals,
 wherein at least one buddy wireless communication terminal of the plurality of wireless communication terminals is further configured to monitor the proximity of at least one wireless device of the plurality of wireless devices associated with one of the other wireless communication terminals and to generate an alert when the proximity of at least one of the wireless devices associated with one of the other wireless communication terminals from the buddy wireless communication terminal meets or exceeds a proximity threshold to alert the user of the buddy wireless communication terminal to the met or exceeded proximity threshold.

2. The system of claim 1, wherein the database is a dynamic database.

3. The system of claim 1, further comprising a base station that receives data relating to the plurality of wireless devices and forwards the data to the processing system.

4. The system of claim 1, wherein the collected data comprises data relating to at least one of the following: time of day the wireless device exceeds the proximity threshold, location at which the wireless device exceeds the proximity threshold, and the frequency at which the wireless device exceeds the proximity threshold.

5. The system of claim 4, wherein the processing system further comprises: a learning module that uses the collected data to provide at least one service to a respective user.

6. The system of claim 5, wherein the at least one service comprises providing a user default profile generated based on the collected data, the user default profile defining the proximity threshold.

7. The system of claim 5, wherein the at least one service comprises providing an option to not generate the alert when the associated respective wireless device exceeds the proximity threshold.

8. The system of claim 5, wherein the alert comprises a notification to the user through the respective associated wireless communication terminal, and the at least one service comprises allowing a user to select a method of providing notification.

9. The system of claim 8, wherein the method of providing notification comprises at least one of the following: alarm generated by the respective associated wireless communication terminal and vibration of the respective associated wireless communication terminal.

10. The system of claim 1, wherein at least one of the plurality of wireless communication terminals is a wireless enabled mobile device.

11. The system of claim 1, wherein at least one of the plurality of wireless communication terminals is a cell phone or a personal digital assistant.

12. A computer-based method for monitoring of location of items, comprising: providing a plurality of wireless devices, each of the plurality of wireless devices being associated with a monitored item;
 configuring each of a plurality of wireless communication terminals, each of the plurality of wireless communication terminals being associated with a respective user and associated with at least one respective associated wireless device of the plurality of wireless devices, to monitor the proximity of the at least one respective associated wireless device and to generate an alert when the proximity of at least one of the associated respective wireless devices exceeds a proximity threshold to alert the respective user to the met or exceeded proximity threshold;
 collecting and storing, using a processing system that is in communication with the plurality of wireless communication terminals, data related to the plurality of wireless devices and the plurality of wireless communication terminals; and
 configuring at least one buddy wireless communication terminal of the plurality of wireless communication terminals to monitor the proximity of at least one wireless device of the plurality of wireless devices associated with one of the other wireless communication terminals and to generate an alert when the proximity of at least one of the wireless devices associated with one of the other wireless communication terminals from the buddy wireless communication terminal meets or exceeds a proximity threshold to alert the user of the buddy wireless communication terminal to the met or exceeded proximity threshold.

13. The method of claim 12, wherein the step of collecting and storing is performed using a database.

14. The method of claim 13, wherein the database is a dynamic database.

15. The method of claim 12, further comprising the step of receiving, at a base station, data relating to the plurality of wireless devices and forwarding, using the base station, the data to the processing system.

16. The method of claim 12, wherein the collected data comprises data relating to at least one of the following: time of day the wireless device exceeds the proximity threshold, location at which the wireless device exceeds the proximity threshold, and the frequency at which the wireless device exceeds the proximity threshold.

17. The method of claim 16, providing, using a learning module, at least one service to a respective user based on the collected data.

18. The method of claim 17, wherein the at least one service comprises providing a user default profile generated based on the collected data, the user default profile defining the proximity threshold.

19. The method of claim 17, wherein the at least one service comprises providing an option to not generate the alert when the associated respective wireless device exceeds the proximity threshold.

20. The method of claim 17, wherein the alert comprises a notification to the user through the respective associated wireless communication terminal, and the at least one service comprises allowing a user to select a method of providing notification.

21. The method of claim 20, wherein the method of providing notification comprises at least one of the following: an alarm generated by the respective associated wireless communication terminal and vibration of the respective associated wireless communication terminal.

22. The method of claim 12, wherein at least one of the plurality of wireless communication terminals is a wireless enabled mobile device.

23. A system for monitoring of location of items, comprising: a plurality of wireless devices, each of the plurality of wireless devices being associated with a monitored item;

a plurality of wireless communication terminals, each of the plurality of wireless communication terminals being associated with a respective user and associated with at least one respective associated wireless device of the plurality of wireless devices and configured to monitor the proximity of the at least one respective associated wireless device and to generate an alert when the proximity of at least one of the associated respective wireless devices from the associated wireless communication terminal meets or exceeds a proximity threshold to alert the respective user to the met or exceeded proximity threshold; and a processing system that is in communication with the plurality of wireless communication terminals, the processing system comprising a database that collects and stores data related to the plurality of wireless devices and the plurality of wireless communication terminals, wherein each of the plurality of wireless communication terminals is further configured to detect at least one wireless device of the plurality of wireless devices the respective wireless communication terminal is not configured to monitor and to transmit data related to the at least one wireless device of the plurality of wireless devices the respective wireless communication terminal is not configured to monitor to the processing system, wherein, if the proximity of a lost wireless device of the plurality of wireless devices from the associated wireless communication terminal exceeds the proximity threshold, the processing system is configured to identify one of the other wireless communication terminals that detects the lost wireless device and to generate a signal enabling direct communication between the user of the wireless communication terminal associated with the lost wireless device and the user of the wireless communication terminal that detects the lost wireless device to facilitate return of the lost wireless device.

* * * * *

(12) INTER PARTES REVIEW CERTIFICATE (2925th)
United States Patent (10) Number: US 8,872,655 K1
Buller et al. (45) Certificate Issued: Dec. 1, 2022

(54) SYSTEM, METHOD AND NETWORK FOR MONITORING OF LOCATION OF ITEMS

(75) Inventors: Matthew Buller; Hamish Orrick; Aiden Turner

(73) Assignee: CELLWITCH INC.

Trial Number:

IPR2020-00317 filed Dec. 18, 2019

Inter Partes Review Certificate for:

Patent No.: 8,872,655
Issued: Oct. 28, 2014
Appl. No.: 12/719,483
Filed: Mar. 8, 2010

The results of IPR2020-00317 are reflected in this inter partes review certificate under 35 U.S.C. 318(b).

INTER PARTES REVIEW CERTIFICATE
U.S. Patent 8,872,655 K1
Trial No. IPR2020-00317
Certificate Issued Dec. 1, 2022

AS A RESULT OF THE INTER PARTES REVIEW PROCEEDING, IT HAS BEEN DETERMINED THAT:

Claims 4-9 and 16-21 are found patentable.

Claims 1-3, 10-15, 22 and 23 are cancelled.

\* \* \* \* \*